United States Patent
Keulemans et al.

(10) Patent No.: US 11,859,105 B2
(45) Date of Patent: Jan. 2, 2024

(54) SELF-CLEANING COATING

(71) Applicant: UNIVERSITEIT ANTWERPEN, Antwerp (BE)

(72) Inventors: Maarten Keulemans, Deurne (BE); Silvia Lenaerts, Berchem (BE); Sammy Verbruggen, Brasschaat (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 559 days.

(21) Appl. No.: 16/760,305

(22) PCT Filed: Nov. 2, 2018

(86) PCT No.: PCT/EP2018/079983
§ 371 (c)(1),
(2) Date: Apr. 29, 2020

(87) PCT Pub. No.: WO2019/086594
PCT Pub. Date: May 9, 2019

(65) Prior Publication Data
US 2020/0347246 A1 Nov. 5, 2020

(30) Foreign Application Priority Data
Nov. 2, 2017 (EP) .................................... 17199799

(51) Int. Cl.
*C09D 7/61* (2018.01)
*C09D 7/40* (2018.01)
(Continued)

(52) U.S. Cl.
CPC .............. *C09D 7/61* (2018.01); *C03C 17/007* (2013.01); *C03C 17/008* (2013.01); *C08K 3/08* (2013.01);
(Continued)

(58) Field of Classification Search
CPC ... C09D 7/61; C09D 7/67; C09D 7/68; C09D 5/00; C09D 1/00; C03C 17/007;
(Continued)

(56) References Cited

U.S. PATENT DOCUMENTS

| 7,976,909 B2 | 7/2011 | Durandeau et al. |
| 2003/0039843 A1 | 2/2003 | Johnson et al. |

(Continued)

FOREIGN PATENT DOCUMENTS

| CN | 1596229 A | 3/2005 |
| CN | 1805789 A | 7/2006 |

(Continued)

OTHER PUBLICATIONS

Office Action from corresponding Chinese Application No. 201880071388.0, dated May 6, 2021.
(Continued)

*Primary Examiner* — Nathan L Van Sell
(74) *Attorney, Agent, or Firm* — Workman Nydegger

(57) ABSTRACT

A method for forming a self-cleaning coating, comprises providing a first dispersion comprising plasmonic nanoparticles by suspending plasmonic nanoparticles in an organic medium and providing a second dispersion comprising a precursor of a photocatalytic matrix in an organic medium. The method further comprises forming a mixture of the first and second dispersion and coating the mixture on a surface. The method also comprises calcining the coated mixture.

5 Claims, 8 Drawing Sheets

(51) Int. Cl.
  *C03C 17/00* (2006.01)
  *C08K 3/08* (2006.01)
  *G02B 1/18* (2015.01)
  *G02B 5/00* (2006.01)
  *G02B 27/00* (2006.01)

(52) U.S. Cl.
  CPC .................. *C09D 7/67* (2018.01); *G02B 1/18* (2015.01); *G02B 5/008* (2013.01); *G02B 27/0006* (2013.01); *C03C 2217/212* (2013.01); *C03C 2217/251* (2013.01); *C03C 2217/76* (2013.01); *C03C 2218/111* (2013.01); *C03C 2218/116* (2013.01); *C08K 2003/085* (2013.01); *C08K 2003/0806* (2013.01); *C08K 2003/0831* (2013.01); *C08K 2003/0868* (2013.01)

(58) Field of Classification Search
  CPC ............ C03C 17/008; C03C 2217/212; C03C 2217/251; C03C 2217/76; C03C 2218/111; C03C 2218/116; C03C 2217/75; C03C 2217/71; C08K 3/08; C08K 2003/0806; C08K 2003/0831; C08K 2003/085; C08K 2003/0868; G02B 1/18; G02B 5/008; G02B 27/0006
  See application file for complete search history.

(56) References Cited

U.S. PATENT DOCUMENTS

| | | | |
|---|---|---|---|
| 2007/0092734 | A1 | 4/2007 | Durandeau et al. |
| 2009/0252693 | A1 | 10/2009 | Baldi et al. |
| 2010/0062032 | A1* | 3/2010 | Sharma ................ C03C 17/256 427/372.2 |
| 2012/0040175 | A1 | 2/2012 | Hurst et al. |
| 2012/0225770 | A1* | 9/2012 | Tamaoka ............ C09D 5/1693 977/773 |
| 2016/0122584 | A1* | 5/2016 | Buskens ................ C08K 3/16 427/508 |

FOREIGN PATENT DOCUMENTS

| | | |
|---|---|---|
| CN | 1816645 A | 8/2006 |
| CN | 101072730 A | 11/2007 |
| CN | 102395536 A | 3/2012 |
| CN | 106914236 A | 7/2017 |
| JP | 2012520758 A | 9/2012 |
| WO | 2016148108 A2 | 9/2016 |

OTHER PUBLICATIONS

Akgun et al., "Sol-Gel Derived Silver-Incorporated Titania Thin Films on Glass: Bactericidal and Photocatalytic Activity," Journal of Sol-Gel Science and Technology, vol. 59, No. 2, May 19, 2011, pp. 228-238.
Ninsonti et al., "Au-Loaded Titanium Dioxide Nanoparticles Synthesized by Modified Sol-Gel/Impregnation Methods and Their Application to Dye-Sensitized Solar Cells," International Journal of Photoenergy, vol. 2014, Article ID 865423, Jan. 1, 2014, pp. 1-8.
Paz et al., "Photooxidative Self-Cleaning Transparent Titanium Dioxide Films on Glass," Journal of Materials Research, vol. 10, No. 11, Nov. 1, 1995, pp. 2842-2848.
Sonawane et al., "Sol-Gel Synthesis of AU/TiO2 Thin Films for Photocatalytic Degradation of Phenol in Sunlight," Journal of Molecular Catalysis A: Chemical, Elsevier, vol. 243, No. 1, Jan. 2, 2006, pp. 68-76.
Tanaka et al., "Gold-Titanium(IV) Oxide Plasmonic Photocatalysts Prepared by a Colloid-Photodeposition Method: Correlation Between Physical Properties and Photocatalytic Activities," Langmuir, vol. 28, Aug. 19, 2012, pp. 13105-13111.
Verbruggen et al., "Plasmonic 'Rainbow' Photocatalyst with Broadband Solar Light Response for Environmental Applications," Applied Catalysis B: Environmental, vol. 188, Feb. 1, 2016, pp. 147-153.
Zheng et al., "A General Synthetic Strategy for Oxide-Supported Metal Nanoparticle Catalysts," Journal of the American Chemical Society, vol. 128, Oct. 13, 2006, pp. 14278-14280.
European Search Report from EP Application No. EP17199799.2, dated Feb. 6, 2018.
International Search Report and Written Opinion from PCT Application No. PCT/EP2018/079983, dated Dec. 6, 2018.
Betul Akkopru Akgun et al., "Effect of silver incorporation on crystallization and microstructural properties of sol-gel derived titania thin films on glass", Journal of Sol-Gel Science and Technology, Jan. 5, 2011, vol. 58, pp. 277-289.
Dario Buso et al., "Gold-Nanoparticle-Doped TiO2 Semiconductor Thin Films: Optical Characterization", Advanced Functional Materials, as early as Jan. 10, 2007, vol. 17, pp. 347-354.
R.S. Sonawane et al., "Sol-gel synthesis of Au/TiO2 thin films for photocatalytic degradation of phenol in sunlight", Journal of Molecular Catalysis A: Chemical, Jan. 2, 2006, vol. 243, Issue 1, pp. 68-76.
Office Action in corresponding Japanese Patent Application No. 2020-524453, dated Feb. 7, 2023.

* cited by examiner

SELF-CLEANING COATING

TECHNICAL FIELD OF THE INVENTION

The present invention relates to self-cleaning coatings and in particular to such coatings wherein the self-cleaning action comprises a photocatalytic process.

BACKGROUND OF THE INVENTION

One of the key struggles for our society in the coming decades is how to deal with multiple kinds of waste in our environment: pollutants from energy production and transport, herbicides and pesticides used in food production, pharmaceuticals from urine, plastics from packaging, waste produced in industry and so on. Many of these molecules have a significant impact on the environment as they pollute the air and water streams. This not only has a big influence on wildlife but also has a substantial impact on human health, as well as having environmental effects such as contributing to global warming, ozone depletion or create smog. There is, therefore, a need for materials to remove pollutants from air and water streams.

In this context, the semiconductor $TiO_2$ (titanium dioxide, titania) is very attractive as it is abundant, cheap, non-toxic, biocompatible, chemically stable in a wide pH range and it exhibits promising (photo)catalytic properties. Especially as a photocatalyst, $TiO_2$ is very interesting for green chemistry as it can degrade e.g. organic molecules to $CO_2$ and water under solar irradiation.

When $TiO_2$ is used toward self-cleaning applications, thin films, capable of removing pollutants from the surface using sunlight, are deposited on a substrate with a thickness ranging from a few nanometers to some micrometers. Different methods exist to obtain $TiO_2$ thin films such as sputtering, the sol-gel process, thermal methods and chemical vapor deposition (CVD). Of these techniques the sol gel method is quite straightforward and can be easily performed on a wide variety of substrates via spin- or dip-coating a liquid solution containing $TiO_2$ precursor molecules which are subsequently crystallized after an additional heat treatment step.

$TiO_2$ has two major drawbacks as a catalyst: a high recombination rate (around 90%) resulting in fewer electrons and holes that can participate in the reactions and thus less activity, and its wide bandgap (3.2 eV). The wide bandgap implies that only UV light (4% of the solar spectrum) can be used to excite electrons from the valence to the conduction band while the visible part of the sunlight (about 50% of the solar spectrum) remains unused.

One way to address the absorption problem is to functionalize a surface of the $TiO_2$ with metal nanoparticles; e.g. using a method such as described by Zheng et al. (2006) (Zheng, Nanfeng, and Galen D. Stucky. "A general synthetic strategy for oxide-supported metal nanoparticle catalysts." Journal of the American Chemical Society 128.44 (2006): 14278-14280) and by Tanaka et al. "Gold-titanium(IV) oxide plasmonic photocatalysts prepared by a colloid-photodeposition method: Correlation between physical properties and photocatalytic activities" in Langmuir (2012) 28 pages 13105-13111. The metal nanoparticles may improve the photocatalytic properties of the underlying material by extending the effective absorption range of the $TiO_2$. However, several difficulties are associated with this approach. Firstly, the metal nanoparticles may be only weakly adsorbed to the $TiO_2$ surface and may thus easily detach. Secondly, the metal nanoparticles are exposed and thus prone to react with compounds in the environment (e.g. pollutants), thereby changing their chemical nature. Thirdly, the beneficial interaction between the metal nanoparticle and $TiO_2$ is limited to the top $TiO_2$ layer and is not present throughout the bulk of the material. Fourthly, the metal nanoparticles take up valuable surface area from the photocatalytic material. Degradation reactions, similar to other catalytic reactions, proceed on the surface of the catalyst. Maximizing the specific surface area therefore increases the activity of the material as more surface is available for the reaction to take place. The available surface area often plays a key role in determining the quantity of a pollutant that can be degraded within a given time frame.

There is thus still a need in the art for better self-cleaning coatings.

SUMMARY OF THE INVENTION

It is an object of the present invention to provide good coatings which are photocatalytically self-cleaning and articles comprising said coatings. It is a further object of the present invention to provide good methods for forming said coatings. The above objective is accomplished by a method and device according to the present invention.

It is an advantage of embodiments of the present invention that the self-cleaning properties of a photocatalytic material can be improved by extending the range of the electromagnetic spectrum that is exploited.

It is an advantage of embodiments of the present invention that the plasmonic nanoparticles can be more tightly integrated with the photocatalytic material.

It is an advantage of embodiments of the present invention that the photocatalytic nanoparticles can be protected.

It is an advantage of embodiments of the present invention that the photocatalytic matrix can have good photocatalytic properties based on the absorption of UV light. It is a further advantage of embodiments of the present invention that the self-cleaning coating can be transparent.

It is an advantage of embodiments of the present invention that the photocatalytic self-cleaning may be supplemented with a self-cleaning based on a highly hydrophilic or hydrophobic surface.

It is an advantage of embodiments of the present invention that the range of the electromagnetic spectrum that is exploited can be extended to substantially include the entire visible range of the electromagnetic spectrum.

It is an advantage of embodiments of the present invention that a surface of an article can be made to have self-cleaning properties. It is a further advantage of embodiments of the present invention that the self-cleaning coating can be easily provided on a variety of surfaces. It is yet a further advantage of embodiments of the present invention that the self-cleaning coating can be provided on a surface in a relatively economical way.

It is an advantage of embodiments of the present invention that the plasmonic nanoparticles can be well dispersed in the final self-cleaning coating.

It is an advantage of embodiments of the present invention that the self-cleaning coating can be relatively simple to produce.

It is an advantage of embodiments of the present invention that the self-cleaning coating can be formed in a relatively economical way.

It is an advantage of embodiments of the present invention that the formation method can be well controlled. It is a further advantage of embodiments of the present invention that formation of the self-cleaning coating can be achieved using the well-researched sol-gel process.

It is an advantage of embodiments of the present invention that the plasmonic nanoparticles can be well stabilized in an organic solvent dispersion.

It is an advantage of embodiments of the present invention that the method of formation can be acid or base catalysed.

It is an advantage of embodiments of the present invention that, in contrast to the 'traditional method' where the nanoparticles are deposited on the photocatalyst surface in a multi-step process, the nanoparticles are mixed with the titanium dioxide precursor during the $TiO_2$ sol gel synthesis process causing them to be homogeneously dispersed and fully embedded in the resulting $TiO_2$ matrix. This results in beneficiary effects on the self-cleaning activity of embedding the nanoparticles in the $TiO_2$ matrix.

It is an advantage of embodiments of the present invention that UV light induces electron-hole pair excitation in the semiconductor while the nanoparticle solely acts as a passive electron sink, resulting in less recombination events, whereas furthermore for $Au/TiO_2$ composites under visible light illumination, direct electron injection from the plasmon excited nanoparticle into the conduction band of $TiO_2$ also plays an important role.

It is an advantage of embodiments of the present invention that direct contact between the nanoparticle and the semiconductor improves both of the energy transfer processes that can occur. It is an advantage of embodiments of the present invention that by partially or fully embedding the nanoparticles in the $TiO_2$ matrix, the contact interface is drastically increased which can lead to considerably higher photocatalytic activities. In addition, partially or fully embedding the nanoparticles in a rigid matrix according to embodiments of the present invention protects them from chemical corrosion, reshaping, agglomerating and detaching during post-deposition sample treatment or photocatalytic testing, thereby adding to the stability of the entire composite system.

It is an advantage of at least some embodiments of the present invention that the nanoparticles are first prepared separately in a batch system after which they are introduced in the sol gel process (ex-situ method).

It is an advantage of embodiments of the present invention that the ex-situ method allows accurate and precise control of the nanoparticle properties, tailored to the envisaged needs.

In a first aspect, the present invention relates to a method for forming a self-cleaning coating, comprising:
  providing a first dispersion comprising plasmonic nanoparticles in an organic medium,
  providing a second dispersion comprising a precursor of a photocatalytic matrix, in an organic medium,
  forming a mixture of the first and second dispersion,
  coating the mixture on a surface, and
  calcining the coated mixture.

The step of providing the first dispersion may comprise dispersing the plasmonic nanoparticles in an organic solvent The plasmonic nanoparticles may be complexed with a stabilizing agent, prior to suspending it in the organic solvent, the stabilizing agent being suitable for stabilizing the dispersion of the plasmonic nanoparticles in the organic solvent. Prior to dispersing the plasmonic nanoparticles in an organic medium, they may first be made in an aqueous medium and be then complexed with the stabilizing agent.

The plasmonic nanoparticles may comprise a noble metal and/or wherein the precursor of the photocatalytic matrix is a precursor of $TiO_2$.

The step of forming the mixture of the first and second dispersion may comprise forming a sol.

The step of coating the mixture on a surface may comprise applying a wet coating technique.

The step of calcining the coated mixture may comprise heating up the coated mixture to a temperature of from 300° C. to 800° C., e.g. 450° C. to 650° C., preferably from 500° C. to 600° C.

The second dispersion further may comprise dispersing in an organic solvent.

The first solution may further comprise an acid.

In a second aspect, the present invention relates to a self-cleaning coating, comprising a photocatalytic matrix, and plasmonic nanoparticles embedded in the photocatalytic matrix. The self-cleaning coating thereby is made using a method according to embodiments of the first aspect.

The plasmonic nanoparticles may be present in the coating in a weight concentration between 0.01% and 3%.

The coating may have a transmission of at least 50%.

The photocatalytic matrix may comprise or may be $TiO_2$.

The plasmonic nanoparticles may comprise or may be a noble metal.

The noble metal may be selected from the list of Ru, Rh, Pd, Ag, Os, Ir, Pt, Au, Hg, Re and Cu.

The coating may have a thickness larger than 25 nm, advantageously larger than 40 nm.

The Arithmetical Mean Height in an AFM measurement of the coating may be lower than 1.5 nm.

In a third aspect, the present invention relates to an article with a self-cleaning surface, the article comprising at least one surface, and a layer of the self-cleaning coating, as defined in any embodiment of the second aspect, covering the surface.

In a fourth aspect, the present invention relates to a use of plasmonic nanoparticles embedded in a photocatalytic matrix for enhancing a self-cleaning property of said photocatalytic matrix. The use may be use of a layer according to the second aspect on an article for enhancing a self-cleaning property of the article.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
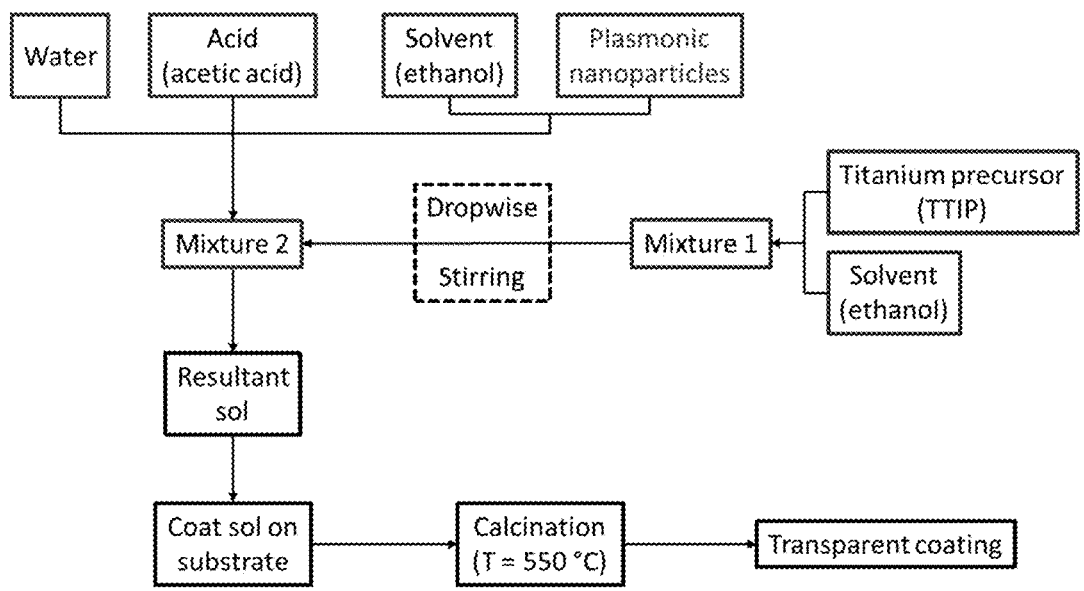
FIG. 1 shows a schematic representation of the used ex-situ synthesis procedure whereby the nanoparticles synthesis is separated from the sol gel process for obtaining a plasmon modified transparent thin film, according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable with their antonyms under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Further more, an element described herein of an apparatus embodiment is an example of a means for carrying out the function performed by the element for the purpose of carrying out the invention.

In the description provided herein, numerous specific details are set forth. However, it is understood that embodiments of the invention may be practised without these specific details. In other instances, well-known methods, structures and techniques have not been shown in detail in order not to obscure an understanding of this description.

In a first aspect, the present invention relates to a self-cleaning coating, comprising a photocatalytic matrix, and plasmonic nanoparticles embedded in the photocatalytic matrix.

The photocatalytic matrix is typically a material which can embed the plasmonic nanoparticles and can photocatalytically degrade (e.g. decompose) an undesired pollutant. In embodiments, the self-cleaning coating may be suitable for degrading at least one pollutant. In embodiments, the pollutant may be an organic compound (e.g. a volatile organic compound), an inorganic compound (e.g. a nitrogen oxide) or a microorganism (e.g. a bacteria, fungus, virus or parasite). In embodiments, the pollutant may be present in a fluid, e.g. in a liquid or in a gas. The self-cleaning coating may be used in a gas environment (e.g. air) and/or submerged in a liquid (e.g. water, such as wastewater). The self-cleaning coating may be useful outside; e.g. to degrade an environmental pollutant, or to keep a window, wall or roof dirt free. Likewise, the self-cleaning coating may also be useful in-house; e.g. to keep a window of a fish tank free from dirt and algae, to degrade a tobacco smoke, or to provide an antimicrobial property to a wall, door, handle, etc. (e.g. in a hospital).

Without being bound by theory, it is believed that photoexcitations in the photocatalytic matrix facilitate decomposition reactions involving the pollutant. These decomposition reactions may further comprise other reactants in the environment, such as oxygen or water. For example, an energy transfer may occur from a photoexcitation in the photocatalytic matrix to oxygen, resulting in the formation of a highly reactive oxygen species (e.g. an oxygen radical). These highly reactive oxygen species may then in turn react with the pollutant, or an intermediate degradation product, to form a further degradation product. In embodiments, degrading the at least one pollutant may comprise a series of oxidation steps. The degradation products of a fully degraded pollutant may, for example, comprise carbon dioxide and water.

In embodiments, the self-cleaning coating may have a highly hydrophilic or highly hydrophobic surface. The highly hydrophilic surface may, for example, be characterized by a static water contact angle of 45° or lower, preferably 30° or lower, more preferably 20° or lower. The highly hydrophobic surface may, for example, be characterized by a static water contact angle of 135° or higher, preferably 150° or higher, more preferably 160° or higher. Typically in combination with water (e.g. rain), highly hydrophilic or highly hydrophobic surfaces provide an alternative form of self-cleaning by preventing the accumulation of pollutants (e.g. dirt) on the surface and having them easily washed them away (e.g. by rain). In the case of a highly hydrophilic surface, sheeting water may carry away the pollutants. Conversely, in the case of a highly hydrophobic surface, the pollutants may be carried away by rolling water droplets. This alternative form of self-cleaning is furthermore compatible with the photocatalytic self-cleaning and can thus be provided in addition thereto.

In embodiments, the photocatalytic matrix may comprise $TiO_2$, but any other photocatalyst like ZnO, $WO_3$, CdS, etc. or their combination. $TiO_2$ is advantageously known to have good photocatalytic properties. Moreover, $TiO_2$ absorbs light in the UV range, thereby allowing it to function as a matrix in a self-cleaning coating which is advantageously transparent to visible light. This is a useful property in many applications, both when the self-cleaning coating is to be applied on a surface which is preferably transparent (such on a glass pane of a window or solar panel), as well as when a change in appearance of the surface (e.g. a color change) due to the coating is undesired. By introducing plasmonic nanoparticles, the coating thus remains substantially transparent, but it does absorb in the visible light region, which typically may give a haze of a certain colour. Additionally, $TiO_2$ is known to become highly hydrophilic (e.g. superhydrophilic) when exposed to light (e.g. sunlight). As such, a dual form of self-cleaning can be provided by the $TiO_2$ comprising self-cleaning coating, combining both the photocatalytic degradation of pollutants and the anti-sticking nature of a highly hydrophilic surface.

It was surprisingly found within the present invention that the self-cleaning action of a photocatalytic matrix can be enhanced by embedding therein plasmonic nanoparticles. The plasmonic nanoparticles can for example advantageously extend the spectral range that can be exploited by the photocatalytic matrix (i.e. improve the spectral response), by absorbing light outside the absorption range of the photocatalytic matrix and subsequently transferring the energy associated with the excited state to the photocatalytic matrix (e.g. hot electron transfer). Alternatively, or additionally, the plasmonic nanoparticles may facilitate the spatial separation of excitons into distinct charge carriers (e.g. electrons and holes), due to the presence of a barrier (e.g. a Schottky barrier) near the matrix-nanoparticle interface. The spatial separation of charge carriers hinders their recombination rate; a recombination which would prevent them from contributing to the photocatalytic degradation.

It should be noted that the concentration of nanoparticles need not be large to obtain a considerable effect. As such, even when the plasmonic nanoparticles absorb in the visible range of the electromagnetic spectrum, the self-cleaning coating can remain highly transparent and colourless. The concentration of nanoparticles may be within 0.01 weight % and 4 weight %, e.g. within 0.5 weight % and 4 weight %, e.g. between 1 weight % and 3 weight %.

It is an advantage of embodiments of the present invention that the transmission of the film with embedded nanoparticles can be at least 50%, e.g. at least 60%, e.g. at least 70%, e.g. at least 75%, e.g. at least 80%.

Moreover, embedding the plasmonic nanoparticles in the photocatalytic matrix brings additional advantages compared to e.g. providing the nanoparticles on top of the matrix. A first benefit is that a more even distribution of the nanoparticles can be obtained, while achieving a tighter integration between the nanoparticles and the matrix. This enables the spectral range of a larger portion of the matrix to be extended, e.g. to substantially the whole matrix, as opposed to only a top layer in contact with the nanoparticles. Simultaneously, the tighter integration lowers the energy transfer distance that has to be overcome. A second benefit is that the nanoparticles can be protected by the surrounding matrix from e.g. physical and/or chemical influences. Indeed, when the nanoparticles which are not embedded in but attached to a surface of the matrix, they are prone to detachment due to physical forces or prone to a change their nature due to chemical reactions with the environment. A third benefit is that the embedded nanoparticles do not take up valuable, reactive surface area from the photocatalytic matrix; thereby allowing a higher active surface area for the self-cleaning coating, compared to when the nanoparticles would cover the top of the matrix.

In embodiments, the plasmonic nanoparticles may comprise a noble metal. In embodiments, the noble metal may be selected from the list of Ru, Rh, Pd, Ag, Os, Ir, Pt, Au, Hg, Re and Cu. In preferred embodiments, the noble metal may be selected from the list of Ru, Rh, Pd, Ag, Os, Ir, Pt and Au. In very preferred embodiments, the noble metal may be Au or Ag or alloys of both. In embodiments, the plasmonic nanoparticles may have a size of from 3 nm to 200 nm, e.g. from 5 nm to 200 nm, e.g. from 5 nm to 50 nm. In embodiments, the plasmonic nanoparticles may have an absorption band within the spectral region of 390 to 700 nm. In embodiments, the absorption band may substantially cover the entire spectral range of 390 nm to 700 nm. Noble metal plasmonic nanoparticles typically advantageously absorb light in the visible region, which may complement the absorption by the photocatalytic matrix (e.g. $TiO_2$). Furthermore, the absorption characteristics typically depend on the size and shape of the nanoparticles; as such, these characteristics can be controlled through changes in the synthesis of the nanoparticles.

In embodiments, the coating may have a thickness larger than 25 nm, advantageously larger than 40 nm. In embodiments, the coating may have a thickness up to 1 mm, or even higher.

In embodiments, features of the first aspect and its embodiments may independently be as correspondingly described for any embodiment of any other aspect.

In a second aspect, the present invention relates to an article with a self-cleaning surface, the article comprising at least one surface, and a layer of the self-cleaning coating, as defined in any embodiment of the first aspect, covering the surface.

The self-cleaning coating can advantageously be provided on a variety of surfaces, thereby enabling a large variety of articles with self-cleaning properties. In embodiments, the article may comprise a glass pane, a construction material or a fabric. The glass pane may, for example, be comprised in a glass panel, e.g. for use in a fish tank or window, or in a solar panel, e.g. for use in a photovoltaic system. The construction material may, for example, be a brick, a tile, a plaster or a paint. The fabric may, for example, be used in clothing or in drapes.

In embodiments, features of the second aspect and its embodiments may independently be as correspondingly described for any embodiment of any other aspect.

In a third aspect, the present invention relates to a method for forming a self-cleaning coating, comprising:
  providing a first dispersion comprising plasmonic nanoparticles,
  providing a second dispersion (e.g. a solution) comprising a precursor of a photocatalytic matrix,
  forming a mixture of the first and second dispersion,
  coating the mixture on a surface, and
  calcining the coated mixture.

In this way, a self-cleaning coating can be obtained with advantageously well dispersed plasmonic nanoparticles, and this in a relatively simple and economical way.

In embodiments, the plasmonic nanoparticles may comprise a noble metal. In embodiments, the precursor of the photocatalytic matrix may be a precursor of $TiO_2$, e.g. titanium(IV)isopropoxide.

In embodiments, the step of forming the mixture of the first and second dispersion may comprise forming a sol. The method is preferably based on the well-researched sol-gel process. This process is known to offer a good control of the synthesis, while being relatively economical. For example, using a sol-gel based method, the mixture can typically advantageously be sintered at a lower temperature, compared to other traditional synthesis methods. In embodiments, the step of calcining the coated mixture may comprise heating up the coated mixture to a temperature between 300° C. to 800° C., e.g. between 450 to 650° C., preferably between 500° C. to 600° C., such as 550° C.

In embodiments, the first and/or second dispersion may further comprise an organic solvent, such as ethanol. In embodiments wherein the first dispersion further comprises an organic solvent, the plasmonic nanoparticles may be complexed with a stabilizing agent which is suitable for stabilizing the dispersion of the plasmonic nanoparticles in the organic solvent. In embodiments, the stabilizing agent may be polyvinylpyrrolidone (PVP). In embodiments, complexing the plasmonic nanoparticles with the stabilizing agent may comprise complexing the plasmonic nanoparticles with a first stabilizing agent (for example for stabilizing the plasmonic nanoparticles in an aqueous medium, e.g. sodium citrate) and subsequently exchanging the first stabilizing agent for a second stabilizing agent (for example for stabilizing the plasmonic nanoparticles in an organic medium, e.g. PVP).

The method (e.g. sol-gel based method) may, in general, be catalysed either by an acid or base. An acid catalysed method may be preferred. In embodiments, the first solution may thus further comprise an acid, e.g. acetic acid.

In embodiments, the step of coating the mixture on a surface may comprise a wet coating technique, such as spin coating or dip coating. This advantageously allows the coating to be formed on a variety of surfaces, using relatively economical techniques.

In embodiments, features of the third aspect and its embodiments may independently be as correspondingly described for any embodiment of any other aspect.

In a fourth aspect, the present invention relates to a use of plasmonic nanoparticles embedded in a photocatalytic matrix for enhancing a self-cleaning property of said photocatalytic matrix.

In embodiments, features of the fourth aspect and its embodiments may independently be as correspondingly described for any embodiment of any other aspect.

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

Example 1: Forming a Self-Cleaning Coating

In a first example, a dispersion of Au plasmonic nanoparticles in ethanol (i.e. a solvent) was mixed with water and an acetic acid in a reaction vessel. Subsequently, a solution of a titanium(IV)isopropoxide photocatalytic matrix precursor ethanol (i.e. a solvent) was added dropwise to the reaction vessel under stirring; a sol was thereby obtained. The sol was then coated by spin or dip coating onto a substrate. The coated sol was calcined at 550° C. and a transparent self-cleaning coating was formed.

Further by way of illustration, results will be discussed illustrating features and advantages of embodiments of the present invention. The results illustrate how embedded systems can be used as an economically feasible catalyst for self-cleaning applications. The photocatalytic self-cleaning activity was evaluated by means of a stearic acid degradation experiment, as this widely recognized model reaction is representative of the group of compounds that typically contaminates glass surfaces.

First the substrate preparation used in this example is discussed. Silicon wafers (15 mm×30 mm) were cleaned ultrasonically in methanol and dried with compressed air. Glass substrates were obtained by cutting microscope slides (15 mm×25 mm) and cleaning them for 15 min at room temperature in fresh piranha solution (7:3 v/v sulfuric acid (Chem-Lab, 95-97%):hydrogen peroxide (Chem-Lab, 30%)) and rinsing them three times with distilled water. The cleaned glass slides were stored in distilled water and blown dry just before spin-coating with compressed air.

Further, the synthesis of PVP stabilized gold nanoparticles used in the present example is discussed. Aqueous colloidal suspensions of Au nanoparticles were prepared using a modified Turkevich procedure but performed at higher concentrations (10 times more concentrated). In short, 10 mL of a 0.01 M $HAuCl_4.3H_2O$ (Sigma-Aldrich, >99.9%) was diluted so a total metal concentration of 1 mM was obtained. The solution was stirred vigorously and brought to boil after which 10 mL of a freshly prepared 1 weight % sodium citrate (Sigma-Aldrich, 99%) solution was quickly added to the boiling solution. After exactly 30 minutes boiling the resulting colloidal Au suspension was immediately cooled to room temperature. The used stabilizing agent, sodium citrate, stabilizes the nanoparticles by charge repulsion and is only weakly bound to nanoparticle causing the as obtained Au nanoparticles to be unstable in organic media. The titanium dioxide precursor solution also contains organic solvents (e.g. ethanol, vide infra) thus necessitating a phase transfer of the nanoparticles from the aqueous phase to the organic phase. This is achieved by exchanging the sodium citrate with PVP (polyvinylpyrrolidone, Alfa Aesar, 10000 g $mol^{-1}$). PVP was dissolved in water by ultrasonicating the solution for 15 minutes. An appropriate amount of the PVP solution (2.5 mM) was added to the colloidal Au suspension so approximately 60 PVP molecules were provided per $nm^2$ nanoparticle surface. The solution was stirred at 600 rpm for 24 h at room temperature to ensure complete exchange of stabilizing agent. The resulting PVP stabilized Au nanoparticles were finally centrifuged, washed and suspended in absolute ethanol (Emplura, 99.5%). UV-VIS absorption spectra of the colloidal Au nanoparticle solutions were measured with a Shimadzu UV-VIS 2600 double beam spectrometer.

Further, the preparation of plasmon modified thin films is discussed. The sols were prepared by the hydrolysis of titanium(IV) isopropoxide (TTIP, Sigma-Aldrich, 97%) in the presence of acetic acid (Riedel-de Haën, 96%). A solution of TTIP and ethanol (0.05:1.64 molar ratio) (henceforth referred to as Mixture 1) was added dropwise to a solution containing water, ethanol and acetic acid (1.07:1.31:0.34 molar ratio) (referred to as Mixture 2) under vigorous stirring. In the case of $Au/TiO_2$ thin film preparation, the ethanol part of Mixture 2 was replaced by a concentrated dispersion containing appropriate amounts of gold nanoparticles in ethanol. This way sols were prepared with a final gold loading of 0.1-0.3-1 and 3 weight % (calculated relative to the total amount of $TiO_2$ formed assuming all TTIP is hydrolyzed). The viscosity change of the formed sol was monitored with a Brookfield LVDV-I prime Digital Viscosimeter to ensure all samples were spin-coated at the same viscosity. Film deposition was thus achieved by spin-coating both the glass and silicon substrates at 1000 rpm for one minute at room temperature. Finally, the samples were calcined at 823 K for three hours at a heating rate of 1 K $min^{-1}$. A schematic overview of the synthesis procedure can be seen in FIG. 1.

Figure 2:
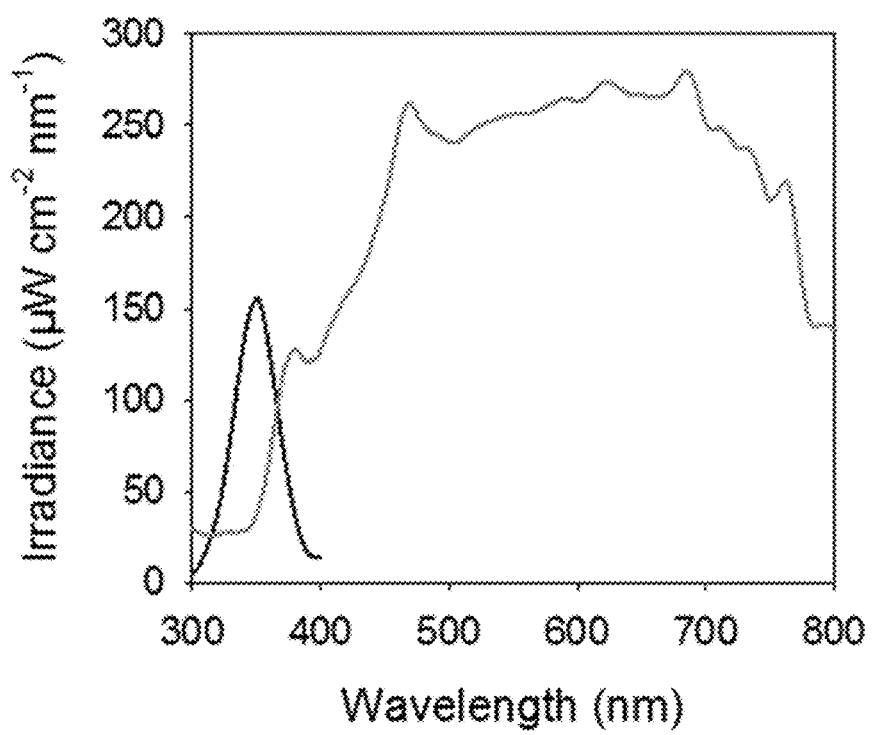
FIG. 2 illustrates absolute irradiance spectra of the different light sources collected at sample distance. Dark line=UVA; light gray curve=simulated solar light using AM1.5 filter set at 100 mW/cm$^2$.

In the following, the self-cleaning activity obtained with the exemplary system manufactured as described above is discussed. The photocatalytic self-cleaning test was conducted by means of a stearic acid degradation experiment, based on the method proposed by Paz et al. in J. Mater. Res. 10 (1995) 2842-2848. In short, a layer of stearic acid was applied on top of the prepared thin films on the silicon wafers by spin coating 100 μL of a 0.25 weight % solution of stearic acid (Sigma-Aldrich, >98.5%) in chloroform (Sigma-Aldrich, >99.8%) at 1000 rpm for one minute. The resulting sample was dried at 363 K and subsequently allowed to equilibrate in the test environment for one hour. For the photocatalytic experiments, the samples were illuminated with: combined simulated solar light (300 W Xe source (Oriel Instruments) equipped with an AM 1.5 solar simulator) and UVA light ($\lambda_{max}$=350 nm, provided by a fluorescent lamp). The corresponding irradiance spectra and intensity outputs are given in FIG. 2. Light intensity and photon fluxes were measured directly at sample distance with a calibrated intensity spectrometer (Avantes Avaspec 3648). The remaining surface coverage of stearic acid was measured using a Nicolet™ 380 (Thermo Fisher Scientific) spectrophotometer equipped with ZnSe windows. All spectra were recorded in the wavenumber range 400-4000 $cm^{-1}$ at resolution of 2 $cm^{-1}$. For each measurement, eight spectra were averaged. The samples were placed at a fixed angel of 9° with the IR beam in order to minimize internal reflections. The stearic acid concentration is related to the integrated absorbance in the wavenumber range 2800-3000 $cm^{-1}$ so that one unit of integrated area (in a.u. $cm^{-1}$) corresponds to $1.39 \times 10^{16}$ stearic acid molecules $cm^{-2}$.

The integrated intensity is 6.9 mW $cm^{-2}$ for the UVA LED source (300-400 nm, curve at the left of the spectrum) and 100.1 mW $cm^{-2}$ for the combined simulated solar light (AM 1.5, 300-800 nm, curve at the right of the spectrum).

Figure 3:
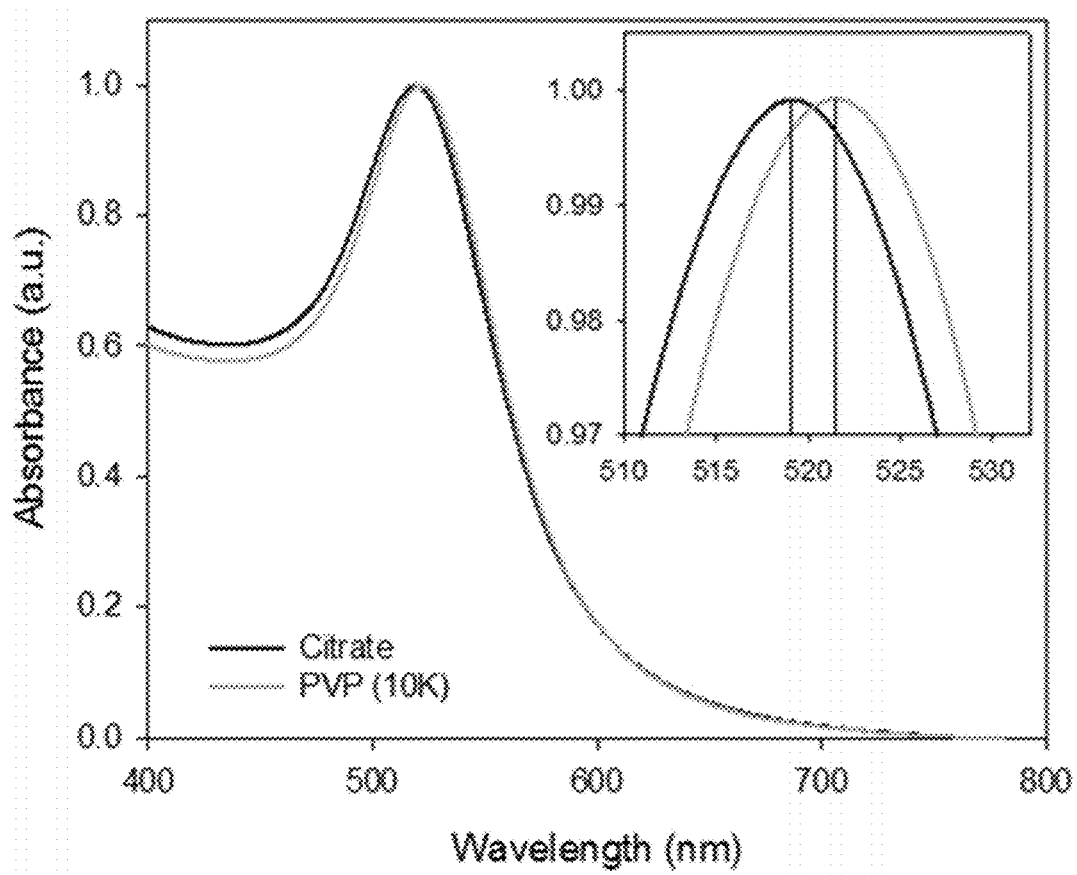
FIG. 3 illustrates the normalized UV-VIS absorption spectra of the 19 nm colloidal gold suspensions before (dark gray line) and after (light gray line) ligand exchange, as can be used in embodiments of the present invention. In the inset a small red-shift of the absorption peak is visible indicating that citrate is replaced with PVP.

In the following, some characterisation results for PVP stabilized gold nanoparticles are further discussed. Concentrated gold suspensions were prepared according to the Turkevich method. The resulting colloidal solutions were dark red and showed a similar UV-VIS absorption spectrum as 100% Au suspensions, indicating that increasing the concentration has no effect on the final nanoparticle properties. The effect of replacing the stabilizing agent from sodium citrate to PVP can be seen in FIG. 3. After ligand exchange a small red-shift of the plasmon peak was observed. This is in line with results obtained by Bastús et al., where a similar red-shift was observed after ligand exchange with various surfactants. This shift is ascribed to an increase in the hydrodynamic diameter, caused by capping the nanoparticles with a bigger, bulky molecule (like PVP).

Figure 5B:
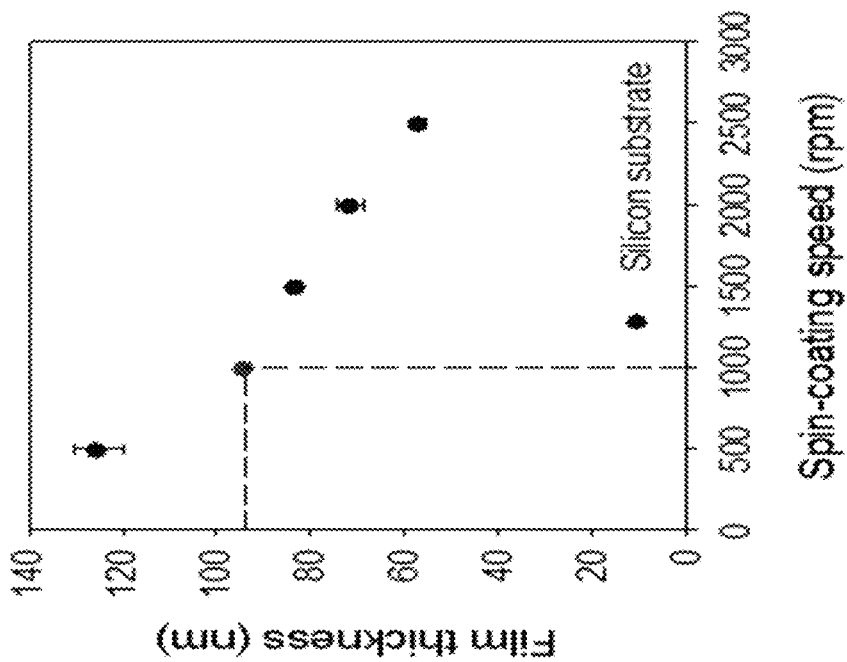
FIGS. 5a and 5b illustrate the effect of (5a) viscosity (spin-coated at 1500 rpm) and (5b) spin-coating speed (viscosity of 4.5 cP) on film thickness for silicon (filled circles) and glass substrates (open circles) as can be used in embodiments of the present invention. All viscosities were determined at spindle speed of 12 rpm. Film thickness was measured with ellipsometry.
Figure 5A:
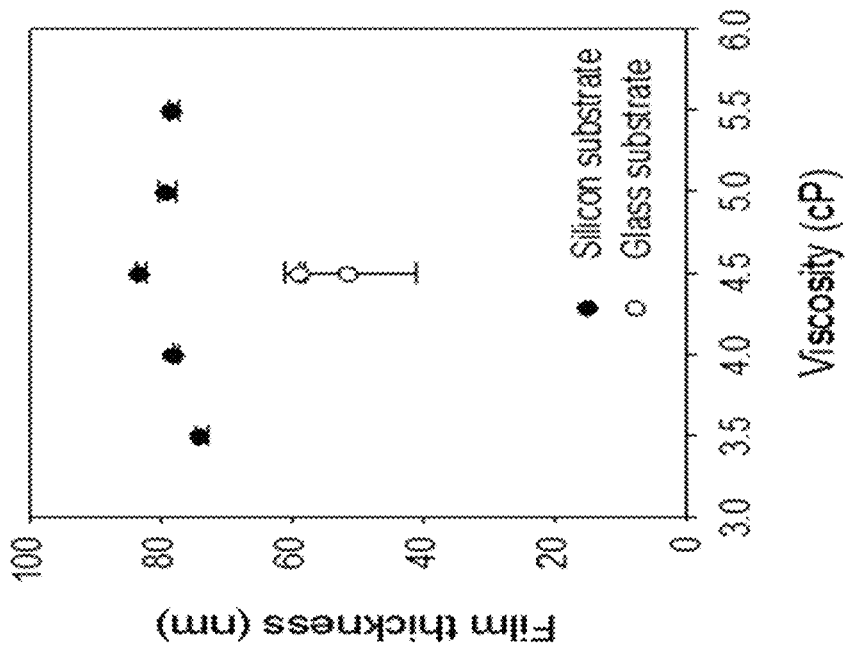

In the following, some characterization results for plasmon modified transparent thin films are presented. For obtaining these thin films, the PVP stabilized nanoparticles were dispersed in EtOH and added to Mixture 2 (FIG. 1) to be incorporated into the $TiO_2$ matrix during the sol gel process. Thin films were deposited on both silicon and glass substrates by spin-coating the resulting sols at the same viscosity. Previous experiments on the effect of spin-coating speed and viscosity on the film thickness on silicon wafers have shown that changing the viscosity of the coating sol has limited effect on film thickness (as shown in FIG. 5a). Altering the spinning speed on the other hand clearly influences film thickness, as is evidenced in FIG. 5b. Based on these results, it was opted to use a spin-coating speed of 1000 rpm for the plasmon modified thin films, resulting in a layer thickness of ±94 nm (as shown in FIG. 5b). Similar experiments performed on microscope glass slides have shown that the overall layer thickness is somewhat lower when this substrate is used (FIG. 5a, open circles).

Figure 4:
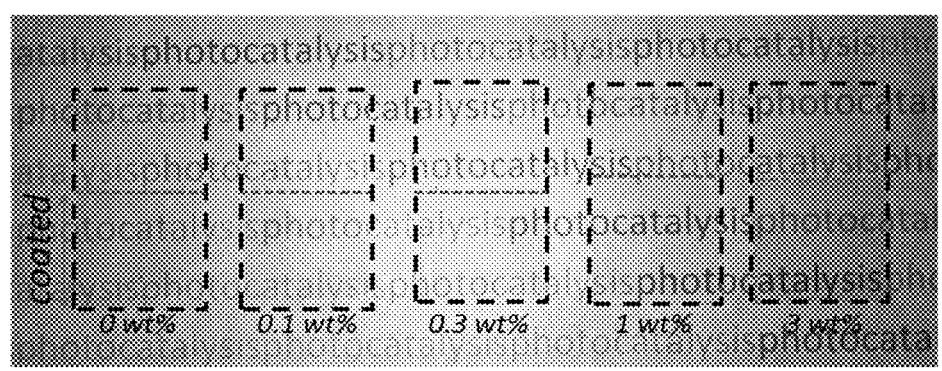
FIG. 4 shows a photograph of the coated glass slides, according to embodiments of the present invention. Only the bottom half is coated for comparative purposes.

The light transmittance of the coatings is evaluated (table 1). More particularly, table 1 shows the light transmittance of the coatings with varying gold loadings (calculated by measuring the light intensity coming through the glass slide and the coating in the wavelength range from 300 to 800 nm). Coating the glass slide with a thin, unmodified layer of $TiO_2$ reduces the amount of light passing through the sample by 17%. The coating is also visible as it has a slightly colored appearance as can be seen in FIG. 4. It has however to be stressed that at this point, no actions have been undertaken to improve the transparency of the $TiO_2$ film. Lowering the film thickness will for instance already improve the transparency (keeping the tradeoff with photocatalytic activity in mind). Combining the $TiO_2$ with a low refractive index material like $SiO_2$ is another method that allows to control the optical properties of the resulting film. Progress can thus still be made. It can however be seen in table 1 that an additional loss of only 4% is observed when loading the films with 3 weight % Au (highest loading). This is a promising result as it indicates that adding gold nanoparticles only has a limited effect on the light transmitting properties of the resulting film.

TABLE 1

| Sample | Transmittance (%) |
| --- | --- |
| Uncoated glass | 100 |
| 0 weight % $TiO_2$ coating | 83 |
| 0.1 weight % Au/$TiO_2$ coating | 82 |
| 0.3 weight % Au/$TiO_2$ coating | 81 |
| 1 weight % Au/$TiO_2$ coating | 81 |
| 3 weight % Au/$TiO_2$ coating | 79 |

Figures 6A, 6B:
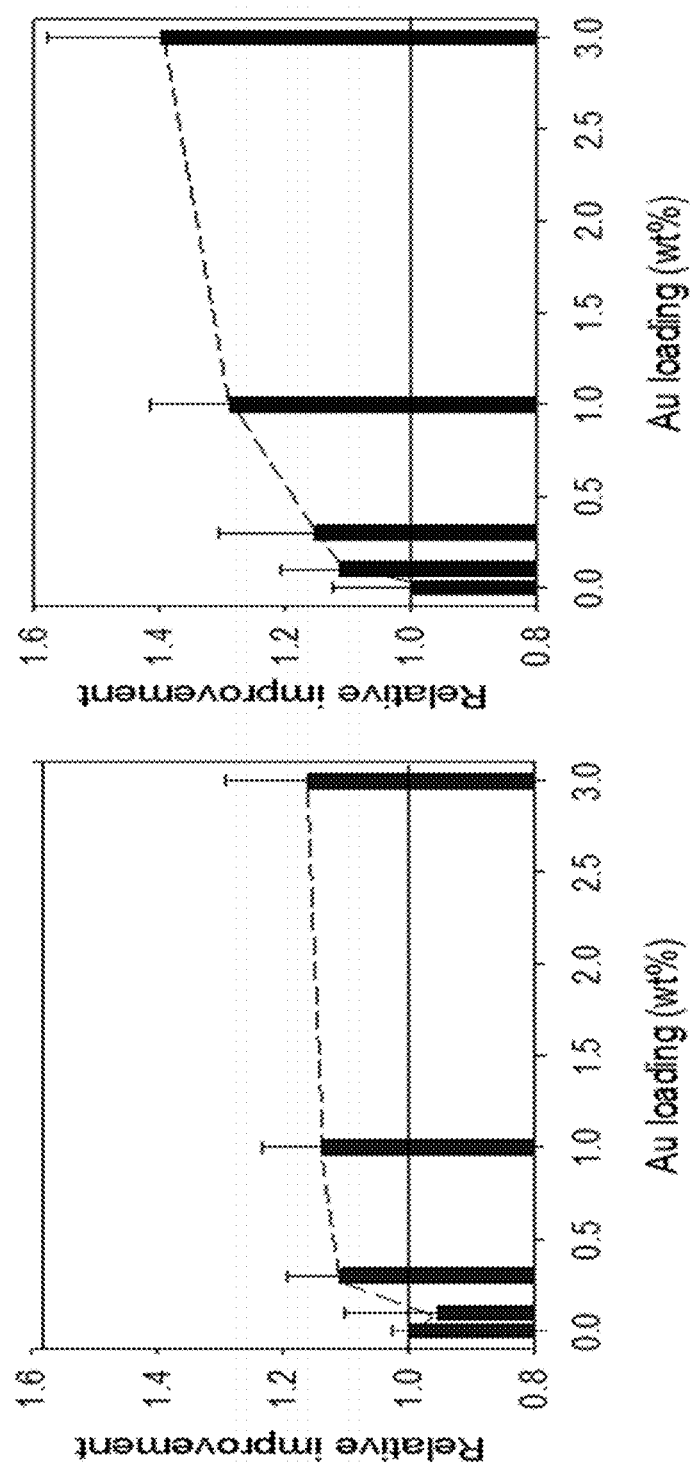
FIGS. 6a and 6b show the relative improvement of the embedded Au/TiO$_2$ samples with different loadings with regard to the unmodified thin film under (6a) UVA and (6b) AM1.5 simulated solar light illumination, illustrating advantages of embodiments of the present invention.

As indicated above, the photocatalytic activity of the films was evaluated by monitoring the stearic acid degradation, a widely accepted method for assessing the activity of self-cleaning materials as stearic acid is a good model compound for organic fouling on glass windows. The results of these experiments performed under both UVA and simulated solar light are shown in FIGS. 6a and 6b. As the added value of modifying the $TiO_2$ thin films with gold is our main interest, the formal quantum efficiencies of all samples are expressed relative to the unmodified sample. Under pure UVA illumination (FIG. 6a) it can be seen that embedding gold nanoparticles into $TiO_2$ causes the photocatalytic activity to increase compared to the unmodified sample (up to 16% for the 3 weight % sample). This result differs from a system where surface modification with noble metals led to a reduced activity, likely due to the metal particles blocking the active sites and shielding part of the $TiO_2$ surface from incoming light. By altering the catalyst design, i.e. embedding the nanoparticles into the $TiO_2$ matrix, these issues are circumvented. In addition, the contact area between nanoparticle and $TiO_2$ is drastically increased, possibly leading to an improved electron transfer efficiency from the excited semiconductor to the passive Au nanoparticle electron sink.

Under broadband solar light illumination (FIG. 6b) a similar trend can be observed, where higher loadings lead to an increased activity relative to the unmodified sample. The relative improvement starts to saturate around 1 weight %, which thus can be considered to be a sufficient load. Relative improvements up to 29 and 40% (for the 1 weight % and 3 weight % sample respectively) are achieved. Interestingly, these improvements are far more than the ones observed for under pure UVA illumination (FIG. 6a versus FIG. 6b) and can therefore not be solely attributed to the UV part of the simulated sunlight. These results therefore hint at a synergistic effect of dually exciting the plasmonic photocatalyst under solar irradiation (semiconductor by UV light and plasmonic nanoparticles under visible light illumination).

The efficiency improvement is also twice as much as observed for substrates with a surface modification with noble metals (i.e. substrates where the noble metals are not embedded) for a rainbow photocatalyst e.g. as defined in Verbruggen et al. Applied Catalysis B: Environmental 188 (2016) 147-153, which was optimized to respond to the entire solar spectrum by modifying the $TiO_2$ surface with gold-silver alloys of different sizes and compositions: 16% for the 1.5 weight % surface modified rainbow photocatalyst compared to 29% for the 1 weight % Au embedded photocatalyst under study. As in the current experiments only one nanoparticle composition is used which is not yet tailored to respond to most intense wavelengths of solar irradiation, let alone to the entire solar spectrum (solely pure gold embedded in $TiO_2$), there seems to be ample room for further improving the activity.

Figure 7:
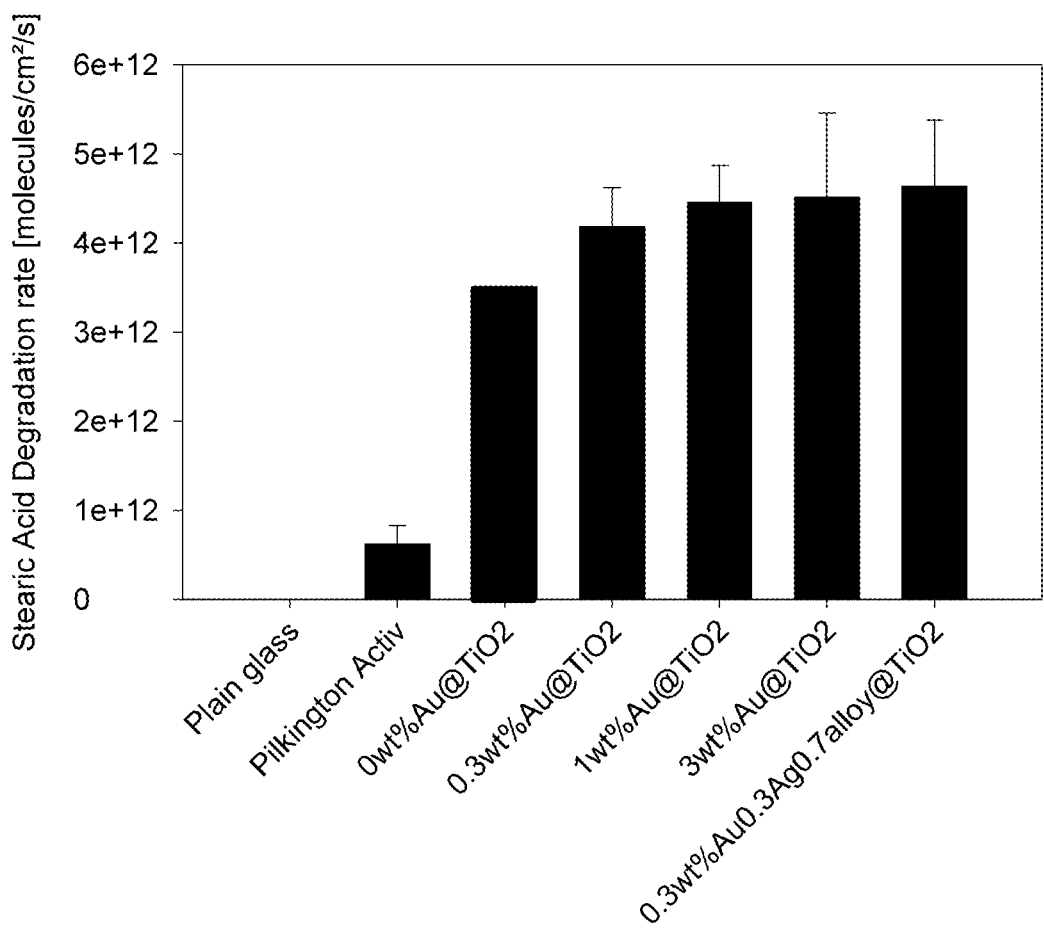
FIG. 7 shows stearic degradation results of different coatings and benchmark samples at 100 mW/cm$^{-2}$ with a 300 W Xe arc discharge lamp equipped with an AM1.5 filter as the light source, illustrating advantages of embodiments of the present invention.

Further by way of illustration, embodiments of the present invention not being limited thereto, further test results regarding the activity of samples are provided below. Various samples have been tested towards their self-cleaning behavior, using stearic acid as a model compound for organic fouling on glass windows. The samples were in the present example tested under ambient conditions and using a 300 W Xe arc discharge lamp equipped with an AM1.5 filter as the light source, adjusted to an incident irradiance of 100 mW cm$^{-2}$. The synthesized coatings were applied on Borofloat glass as the substrate. Pilkington Activ™ was used as the commercially available benchmark. The results are shown in FIG. 7. The plain Borofloat glass showed no self-cleaning activity, as expected. The Pilkington Activ™ benchmark showed a modest activity that was outperformed by coatings according to embodiments of the present invention. Upon introduction of plasmonic gold nanoparticles, an increase in activity was observed with increasing gold fraction, leveling off at loadings around 3 weight %. When using $Au_{0.3}Ag_{0.7}$ bimetallic plasmonic nanoparticles, with plasmon resonance in the wavelength range 490-500 nm, the absorbance of the coating became more adjusted to the peak intensity wavelengths of the solar simulator (and real solar light). This sample showed the highest activity, even at a metal loading as low as 0.3 weight %.

Figure 8:
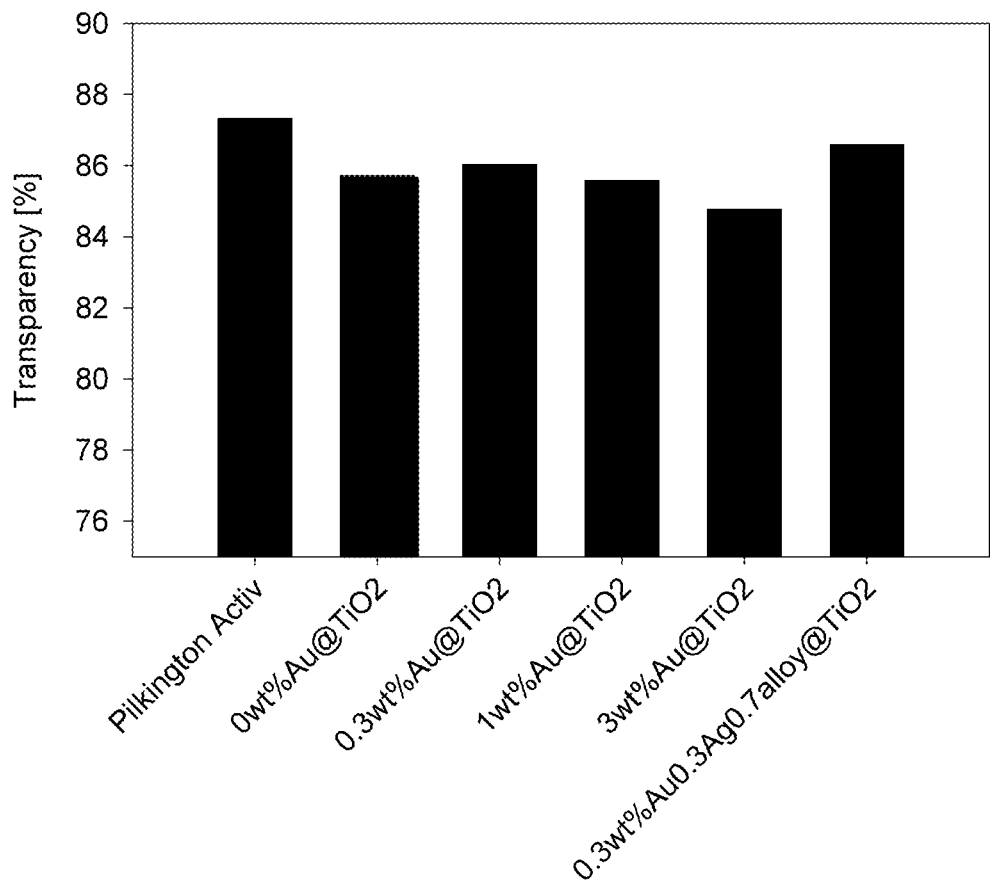
FIG. 8 shows the transparency of prepared samples and benchmark materials, illustrating advantages of embodiments of the present invention.

For the practical application on glass surfaces, high transparency was proposed as one of the main physical properties. The Pilkington Activ™ benchmark glass shows a high transparency of just over 87%. When applying coatings according to embodiments of the present invention on Borofloat, a resulting transparency is achieved in the order of 86%, very close to the benchmark, as can be seen in FIG. 8. The higher the gold loading, the lower the overall transparency. For the Au—Ag bimetallic nanoparticles integrated in the coating, a transparency of almost 87% was measured, which is as good as the commercial benchmark.

Also by way of illustration, embodiments of the present invention not being limited thereto, an example is shown of characteristics of thin films according to embodiments of the present invention. The surface characteristics of a 0.5 weight % Au containing $TiO_2$ coating prepared according to methods according to embodiments of the present invention were compared with films prepared according to the method as described by Sonawane et al. in J. Molecular Catalysis A, 243 (2006) pages 68 to 76.

Figure 9:
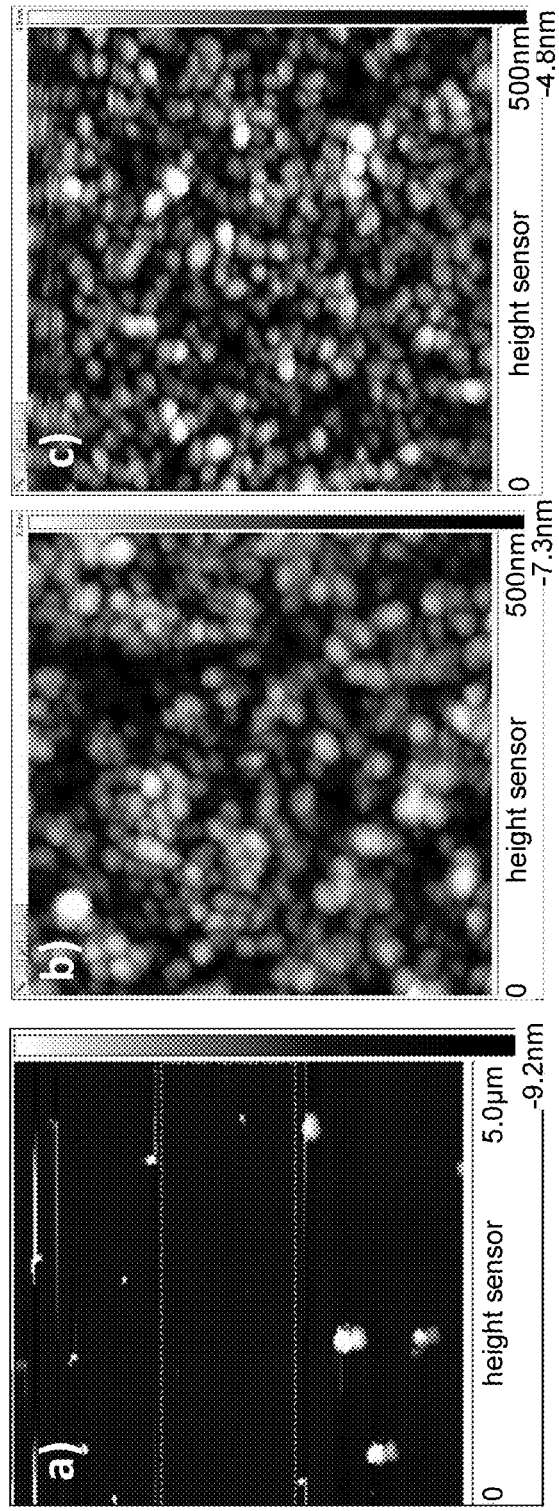
FIG. 9 illustrates AFM measurements of a bare Borofloat substrate, a 0.5 weight % Au—TiO$_2$ coating made according to the method as disclosed by Sonawane et al. and a 0.5 weight % Au—TiO$_2$ coating according to an embodiment of the present invention.

Starting from a bare Borofloat glass substrate with an Arithmetical Mean Height Ra (average roughness factor) of 0.23 nm, applying the 0.5 weight % coating of Sonawane et al. resulted in an average roughness Ra of 1.92 nm. Coating methods according to embodiments of the present invention resulted in a smoother film with an Ra of 1.3 nm. The corresponding AFM images are shown in FIG. 9.

Figure 10:
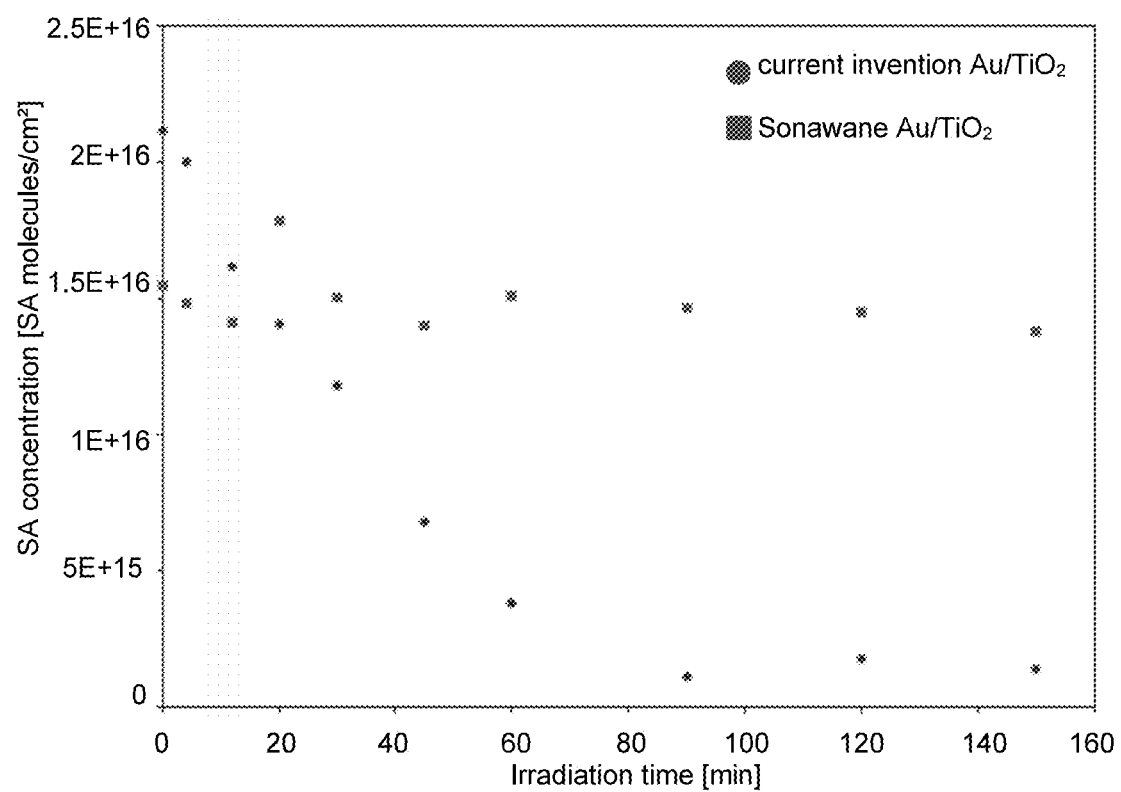
FIG. 10 illustrates the degradation of stearic acid using a coating according to an embodiment of the present invention and a coating made according to a method as disclosed by Sonawane et al.

Further by way of illustration, the activity of a coating according to an embodiment of the present invention (being a coating on a silicon wafer), is tested by evaluating the degradation speed of stearic acid (degradation time scale tested is in the order of minutes, in air). Comparison is made with a coating obtained using the protocol of Sonawane et al. in J. Molecular Catalysis A, 243 (2006) pages 68 to 76. The degradation measurements obtained are shown in FIG. 10, illustrating the degradation by coatings obtained with embodiments of the present invention and Au comprising coatings made according to the Sonawane et al. protocol (as a comparison). It can be seen that for the coatings made according to embodiments of the present invention, the degradation speed is similar as for the same coatings on glass, whereby addition of gold results in a significant improvement. Furthermore, it can be seen that for a similar coating but made using the Sonawane et al. protocol, the degradation reaches only 4% of the amount of degradation obtained with coatings of the present invention, and that the addition of Au does not result in an improvement. It is to be noted that the results given in the article by Sonawane et al. are results for long degradation times, substantially longer than the degradation times evaluated and required in the present examples. The degradation properties of coatings according to embodiments of the present invention therefore also have the advantages of being efficient, not only in degree of degradation but also in degradation time. The absolute measured degradation values for Sonawane et al. based coatings are $1.6 \times 10^{11}$ molecules/cm²/s, whereas based on coatings according to the present invention, the degradation values are $4.8 \times 10^{12}$ molecules/cm²/s.

It is to be understood that although preferred embodiments, specific constructions and configurations, as well as materials, have been discussed herein for devices according to the present invention, various changes or modifications in form and detail may be made without departing from the scope and technical teachings of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A sol-gel method for forming a self-cleaning coating comprising plasmonic nanoparticles dispersed in a photocatalytic matrix, the method comprising:
   a. providing a first dispersion comprising the plasmonic nanoparticles by:
      complexing plasmonic nanoparticles, having a size of from 3 nm to 200 nm, with a stabilizing agent suitable for stabilizing the dispersion of the plasmonic nanoparticles in an organic solvent, by complexing the plasmonic nanoparticles with a first stabilizing agent for stabilizing the plasmonic nanoparticles in an aqueous medium and subsequently exchanging the first stabilizing agent for a second stabilizing agent for stabilizing the plasmonic nanoparticles in an organic medium, and
      suspending the complexed plasmonic nanoparticles in the organic solvent,
   b. providing a second dispersion comprising a precursor of the photocatalytic matrix in an organic medium,
   c. forming a mixture of the first and second dispersion, wherein forming said mixture comprises forming a sol,
   d. coating the mixture on a surface, and
   e. calcining the coated mixture.

2. The method according to claim 1, wherein the plasmonic nanoparticles comprise a noble metal and/or wherein the precursor of the photocatalytic matrix is a precursor of $TiO_2$.

3. The method according to claim 1, wherein step e of calcining the coated mixture comprises heating up the coated mixture to a temperature of from 300° C. to 800° C.

4. The method according to claim 1, wherein the second dispersion further comprises an organic solvent.

5. The method according to claim 1, wherein the first dispersion further comprises an acid.

* * * * *